(12) United States Patent
Ramachandra et al.

(10) Patent No.: US 11,043,130 B2
(45) Date of Patent: Jun. 22, 2021

(54) MULTI-DIMENSIONAL UNI-VECTORED FLIGHT DISPLAY FOR AIRCRAFT

(71) Applicant: HONEYWELL INTERNATIONAL INC., Morris Plains, NJ (US)

(72) Inventors: Sripathi Ramachandra, Karnataka (IN); Greg Carlucci, Phoenix, AZ (US); Richard Snyder, Phoenix, AZ (US); Mohammed Ibrahim Mohideen, Karnataka (IN); Mark Pearson, Peoria, AZ (US); Hyden Lopez, Andhra Pradesh (IN); Christopher Raj Mariadoss, Peoria, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 21 days.

(21) Appl. No.: 16/100,763

(22) Filed: Aug. 10, 2018

(65) Prior Publication Data

US 2020/0051441 A1   Feb. 13, 2020

(51) Int. Cl.
| | |
|---|---|
| *G08G 5/00* | (2006.01) |
| *B64C 13/04* | (2006.01) |
| *B64D 43/00* | (2006.01) |
| *G06T 11/00* | (2006.01) |
| *G06T 11/20* | (2006.01) |

(52) U.S. Cl.
CPC ........... *G08G 5/0021* (2013.01); *B64C 13/04* (2013.01); *B64D 43/00* (2013.01); *G06T 11/001* (2013.01); *G06T 11/206* (2013.01); *G08G 5/003* (2013.01)

(58) Field of Classification Search
CPC .................................................. G08G 5/0021
See application file for complete search history.

(56) References Cited

U.S. PATENT DOCUMENTS

| | | | |
|---|---|---|---|
| 5,445,021 A * | 8/1995 | Cattoen ................ | G01C 23/005 244/186 |
| 6,085,129 A | 7/2000 | Schardt et al. | |
| (Continued) | | | |

OTHER PUBLICATIONS

Matange, Sanjay. "Series plot with varying attributes", published Mar. 2, 2018. Website: https://blogs.sas.com/content/graphicallyspeaking/2018/03/02/series-plot-varying-attributes/ (Year: 2018).*

(Continued)

*Primary Examiner* — Nicholas K Wiltey
*Assistant Examiner* — Tiffany K Luu
(74) *Attorney, Agent, or Firm* — Lorenz & Kopf, LLP (57) ABSTRACT

An aircraft and a method for operating the same may include, but is not limited to, a flight management system, a vertical situation display, and a processor configured to determine a first variable, a second variable and a third variable, determine flight plan data for the first, second and third variables, generate display data for the vertical situation display, the display data including the scale of the first second and third variables and a vector corresponding to the flight plan data of the first variable and second variable scaled to the first scale and the second scale, wherein the scale of the third variable is non-linear and varies based upon the flight plan data corresponding to the third variable relative to the vector, and output the generated display data to the vertical situation display for display on the vertical situation display.

11 Claims, 4 Drawing Sheets

(56) References Cited

U.S. PATENT DOCUMENTS

| | | | |
|---|---|---|---|
| 6,163,743 A * | 12/2000 | Bomans | G05D 1/0607 |
| | | | 244/180 |
| 6,389,355 B1 | 5/2002 | Gibbs et al. | |
| 7,765,061 B1 | 7/2010 | Barber et al. | |
| 7,783,393 B2 | 8/2010 | Tucker et al. | |
| 8,099,201 B1 | 1/2012 | Barber et al. | |
| 8,843,250 B2 | 9/2014 | Tucker et al. | |
| 9,702,726 B2 | 7/2017 | Turner et al. | |
| 2006/0004496 A1 | 1/2006 | Tucker et al. | |
| 2007/0164877 A1* | 7/2007 | Mumaw | G01C 23/00 |
| | | | 340/973 |
| 2010/0250026 A1* | 9/2010 | Deker | G01C 23/00 |
| | | | 701/3 |
| 2010/0265268 A1* | 10/2010 | Wilson | G08G 5/0021 |
| | | | 345/619 |
| 2010/0305783 A1 | 12/2010 | Tucker et al. | |
| 2011/0208374 A1 | 8/2011 | Jayathirtha et al. | |
| 2017/0032576 A1 | 2/2017 | Mazoyer et al. | |

OTHER PUBLICATIONS

Youtube channel name Brian Dick. "How to create a dotted forecast line in excel", published Aug. 11, 2016. Website: https://www.youtube.com/watch?v=OqTxncRUfoQ (Year: 2016).*

* cited by examiner

Determine at least Three Variables Selected by a User

Determine Data for the at least Three Variables

Generate Display Data with the Flight Plan Data Scaled to a First and Second of the Variables and a Scale of the Third (or more) Variable Scaled to the Flight Plan data Receive Command Generate Instruction for Control System

MULTI-DIMENSIONAL UNI-VECTORED FLIGHT DISPLAY FOR AIRCRAFT

TECHNICAL FIELD

The present invention generally relates to aircraft, and more particularly relates to displays and control systems of aircraft.

BACKGROUND

Aircraft are complex machines operating across dozens if not hundreds of flight parameters and aircraft configurations. Modem aircraft often utilize displays, such as vertical situations displays, to inform the crew about the aircraft and the current flight plan for the aircraft. However, current flight displays are often limited as to the number of variables they can display or are too overcrowded with data to be easily read and understood.

BRIEF SUMMARY

In one embodiment, for example, an aircraft is provided. The aircraft may include, but is not limited to, a flight management system configured to manage flight plan data of the aircraft, a vertical situation display, and a processor communicatively coupled to the flight management system and the vertical situation display, wherein the processor is configured to determine a first variable, a second variable and a third variable for the vertical situation display, each of the first, second and third variables having a scale, determine flight plan data from the flight management system for the first, second and third variables, generate display data for the vertical situation display, the display data including the scale of the first variable, the scale of the second variable, and a vector corresponding to the flight plan data of the first variable and second variable scaled to the first scale and the second scale, the display data further including the scale of the third variable, wherein the scale of the third variable is non-linear and varies based upon the flight plan data corresponding to the third variable relative to the vector, and output the generated display data to the vertical situation display for display on the vertical situation display.

In one embodiment, for example, a method of operating a vertical situation display in an aircraft is provided. The method may include, but is not limited to, determining, by a processor, a first variable, a second variable and a third variable for the vertical situation display, each of the first, second and third variables having a scale, determining, by the processor, flight plan data from a flight management system for the first, second and third variables, generating, by the processor, display data for the vertical situation display, the display data including the scale of the first variable, the scale of the second variable, and a vector corresponding to the flight plan data of the first variable and second variable scaled to the first scale and the second scale, the display data further including the scale of the third variable, wherein the scale of the third variable is non-linear and varies based upon the flight plan data corresponding to the third variable relative to the vector, outputting, by the processor, the generated display data to the vertical situation display for display on the vertical situation display.

In one embodiment, for example, a multi-dimensional visualization system for an aircraft is provided. The multi-dimensional visualization system may include, but is not limited to, a display, a user input system, at least one control system configured to control movement of the aircraft, a processor communicatively coupled to the display, the user input system, and the at least one control system, wherein the processor is configured to determine a first variable, a second variable and a third variable for the vertical situation display based upon input from the user input system, each of the first, second and third variables having a scale, determine flight plan data from a flight management system for the first, second and third variables, generate display data for the vertical situation display, the display data including the scale of the first variable, the scale of the second variable, and a vector corresponding to the flight plan data of the first variable and second variable scaled to the first scale and the second scale, the display data further including the scale of the third variable, wherein the scale of the third variable is non-linear and varies based upon the flight plan data corresponding to the third variable relative to the vector, output the generated display data to the vertical situation display for display on the display, receive, from the user input system, a command based upon the generated display data, and generate an instruction for the at least one control system based upon the received command, the instruction causing the at least one control system to control movement of the aircraft.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An aircraft having a multi-dimensional visualization system and a method for operating the same are provided. As discussed in further detail below, the multi-dimensional visualization system provides a simple display of multiple variables allowing for a quicker and easier understanding of the complex operation of the aircraft.

Figure 1:
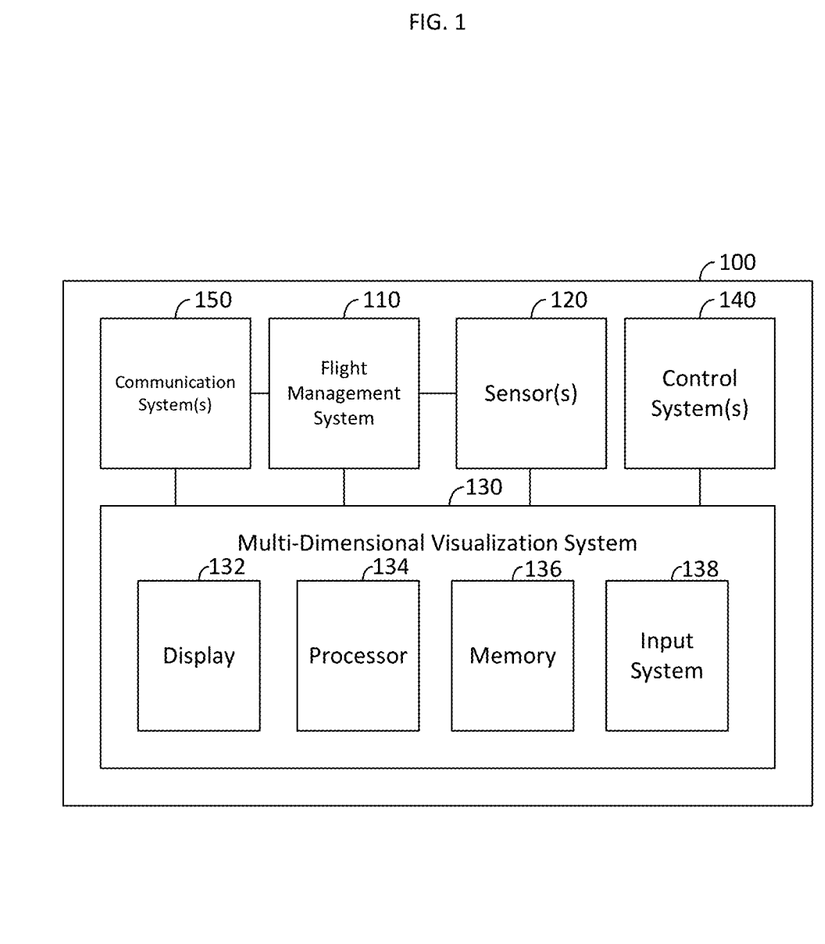
FIG. 1 is a block diagram of an aircraft, in accordance with an embodiment.

FIG. 1 is a block diagram of an aircraft 100, in accordance with an embodiment. In one embodiment, for example, the aircraft 100 may be an airplane. However, in other embodiments the aircraft may be a helicopter, a spacecraft or the like. The aircraft 100 includes a flight management system (FMS) 110 and multiple sensors 120. The FMS 110 utilizes data from the sensors 120 to aid in the operation of the aircraft 100. For example, the FMS 110 may manage a flight plan for the aircraft 100 utilizing sensors 120 such as a global positioning system (GPS), air speed sensors, altimeters, or any other aircraft sensors and any combination thereof.

The aircraft 100 further includes a multi-dimensional visualization system 130. The multi-dimensional visualization system 130 presents flight data to the crew using a single vector, but with multiple scales, as discussed in further detail below. The multi-dimensional visualization system 130 may be used by a pilot or other crew member during flight data analysis. Certain flight data analysis tasks require data from multiple variables which may vary over different scales. For example, one variable used during the analysis may scale over distance, a second variable may scale over time and a third variable may scale over a fuel level in the aircraft 100. The flight data analysis may be performed before a flight commences, during the flight, after the flight, or any combination thereof. As discussed in further detail below, the multi-dimensional visualization system 130 is capable of displaying multiple variables, while using multiple scales, and using only a single vector in a single display, simplifying the flight data analysis.

The multi-dimensional visualization system 130 includes a display 132. The display may be dedicated to the multi-dimensional visualization system 130 or may be shared by any other system on the aircraft 100. In one embodiment, for example, the display 132 may be a vertical situation display. However, any display in the aircraft 100 may be utilized to display the multi-dimensional visualization. The display 132 may be, for example, a liquid-crystal display (LCD), an organic light-emitting diode (OLED) display, a cathode ray tube (CRT) display, a plasma display panel, or any other type of display.

The multi-dimensional visualization system 130 further includes a processor 134 and a memory 136. The processor 134 may be a central processing unit (CPU), a graphics processing unit (GPU), an application specific integrated circuit (ASIC), a field programmable gate array (FPGA), or any other logic device or combination thereof. The memory 136 may be any combination of volatile and non-volatile memory. The processor 134 and memory 136 may be dedicated to the multi-dimensional visualization system 130 or may be shared with one or more other systems in the aircraft 100. The memory 136 may store non-transitory computer readable instructions, which when executed by the processor 134, implement the multi-dimensional visualization system 130, as discussed in further detail below.

The multi-dimensional visualization system 130 further includes and input system 138. The input system 138 may be dedicated to the multi-dimensional visualization system 130 or shared by one or more other systems on the aircraft 100. The input system 138 may include, for example, a touchscreen, a mouse, a trackball, a trackpad, voice controls, gesture controls, or the like, or any combination thereof.

The aircraft 100 further includes one or more control systems 140. The control system(s) 140 may control the aircraft and may include, but are not limited to, engines, valves, flap positions, brakes and the like. As discussed in further detail below, the user of the multi-dimensional visualization system 130 may generate commands to control the aircraft 100 based upon the multi-dimensional visualization system 130.

The aircraft 100 further includes one or more communication systems 150. The communication system(s) 150 may include any wired or wireless communication systems, and any combination thereof. As discussed in further detail below, the multi-dimensional visualization system 130 may receive data from one or more communication systems 150 to be included in the display.

Figure 2:
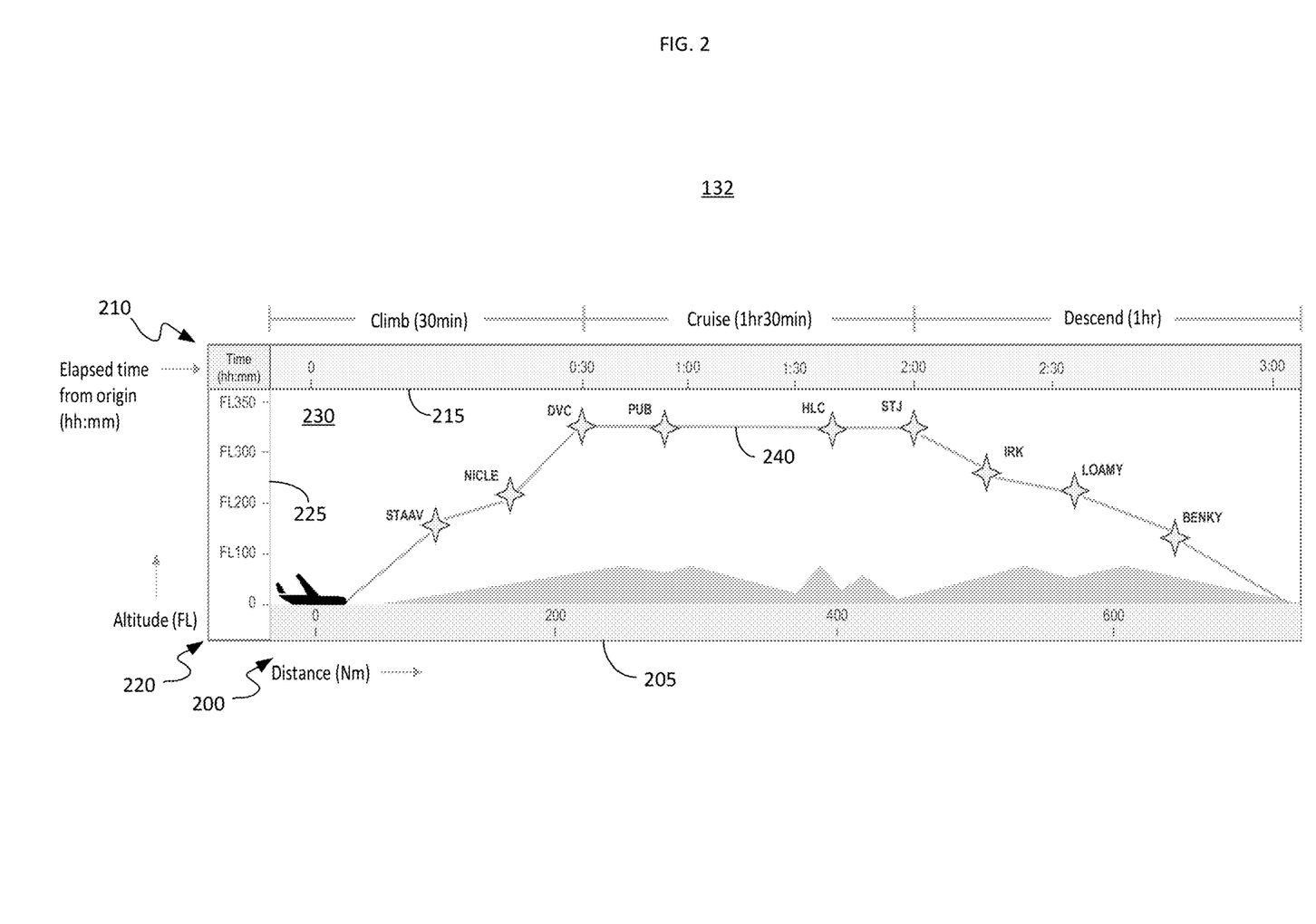
FIG. 2 is an exemplary display of the multi-dimensional visualization system, in accordance with an embodiment.

FIG. 2 is an exemplary display 132 of the multi-dimensional visualization system 130, in accordance with an embodiment. In the embodiment illustrated in FIG. 2, the display 132 is a vertical situation display. As seen in FIG. 2, the exemplary display 132 includes multiple x-axis variables 200 and 210 and a y-axis variable 220. The x-axis variable 200 is displayed with a scale 205, the x-axis variable 210 is displayed with a scale 215, and y-axis variable 220 is displayed with a scale 225. However, the number of variables and the locations of the scales can vary, as discussed in further detail below.

Each variable 200-220 corresponds to an aspect of the flight plan for the aircraft 100 or a variable with respect to the aircraft 100 itself. In the embodiment illustrated in FIG. 2, the x-axis variable 200 is distance from an origin scaled in nautical miles (NM), the x-axis variable 210 is elapsed time from origin scaled in hours and minutes (hh:mm), the y-axis 220 is altitude scaled in flight levels (FL). However, the displayed variables may be selected by the user depending upon the desired data to be viewed. The selectable variables may include, but are not limited to, distance to destination, distance from origin, altitude, time elapsed from origin, total fuel remaining, gross weight, fuel weight, time to reach destination, calibrated air speed, mach, speed target, fuel flow, flight path angle, drag, lift, minimum calibrated air speed, maximum calibrated air speed, speed brake position, international standard atmosphere (ISA) deviation, minimum envelope altitude, maximum envelope altitude, ferry fuel tank quantity, current temperature, wind direction, wind speed or the like. Any of the variables may be selected to be in the x-axis orientation or the y-axis orientation. The variables may be selected by interacting with the display 132 utilizing any of the input systems 138 in any manner.

The processor 134, in a main display area 230, displays a single vector 240 based upon the selected variables and the flight plan of the aircraft 200. In this example, the main display area 230 displays a vector 240 corresponding to an altitude of a flight plan versus a distance to a destination of the flight plan. The vector 240 is scaled to a scale of the selected x-axis variable 200 and the y-axis variable 220. In other words, the processor 134 plots points of the vector 240 according to the scale 205 of the x-axis variable 200 and the scale 225 of the y-axis variable 220. For example, at a distance of about two-hundred nautical miles from the origin, the aircraft 100 is expected to be at an altitude of approximately FL300. The vector 240 may be an expected value or a measured value depending upon the selected variable and the status of the flight. For example, the vector 240 may be displayed as expected data from the FMS 110 before the aircraft begins a flight, then may be gradually updated to actual measured data from the sensors 120 as the flight progresses.

The processor 134 further generates display data for the display 132 for a third variable, here the x-axis 210 and the scale 215, which is scaled to the flight plan data of the vector 240. In other words, the processor 134 adjusts the distance between the hash marks on the scale 215 of the x-axis variable 210 such that scale 215 of the x-axis 210 can be read to correspond to the flight plan data of the x-axis variable 210 relative to the vector 240. This allows all the variables (i.e., the x-axis variable 200, the x-axis variable 210, and the y-axis variable 220) to be visualized together on a single display. For example, at about one hour and forty minutes into the flight, the aircraft should be at an altitude of about FL325 and about four-hundred miles from the origin. Accordingly, unlike multi-vector displays which are difficult to read, because the multi-dimensional visualization system 130 utilizes only a single vector, the system remains easy to read while providing the additional variables to the user. In one embodiment, for example, the user may interact with a specific point flight plan data 240 to get precise data on all the variables at that point. For example, the user may use the input system 138 to select a point on the vector 240 which may cause the display 132 to list or otherwise display the specific data points for all of the variables at the selected point on the flight plan.

Figure 3:
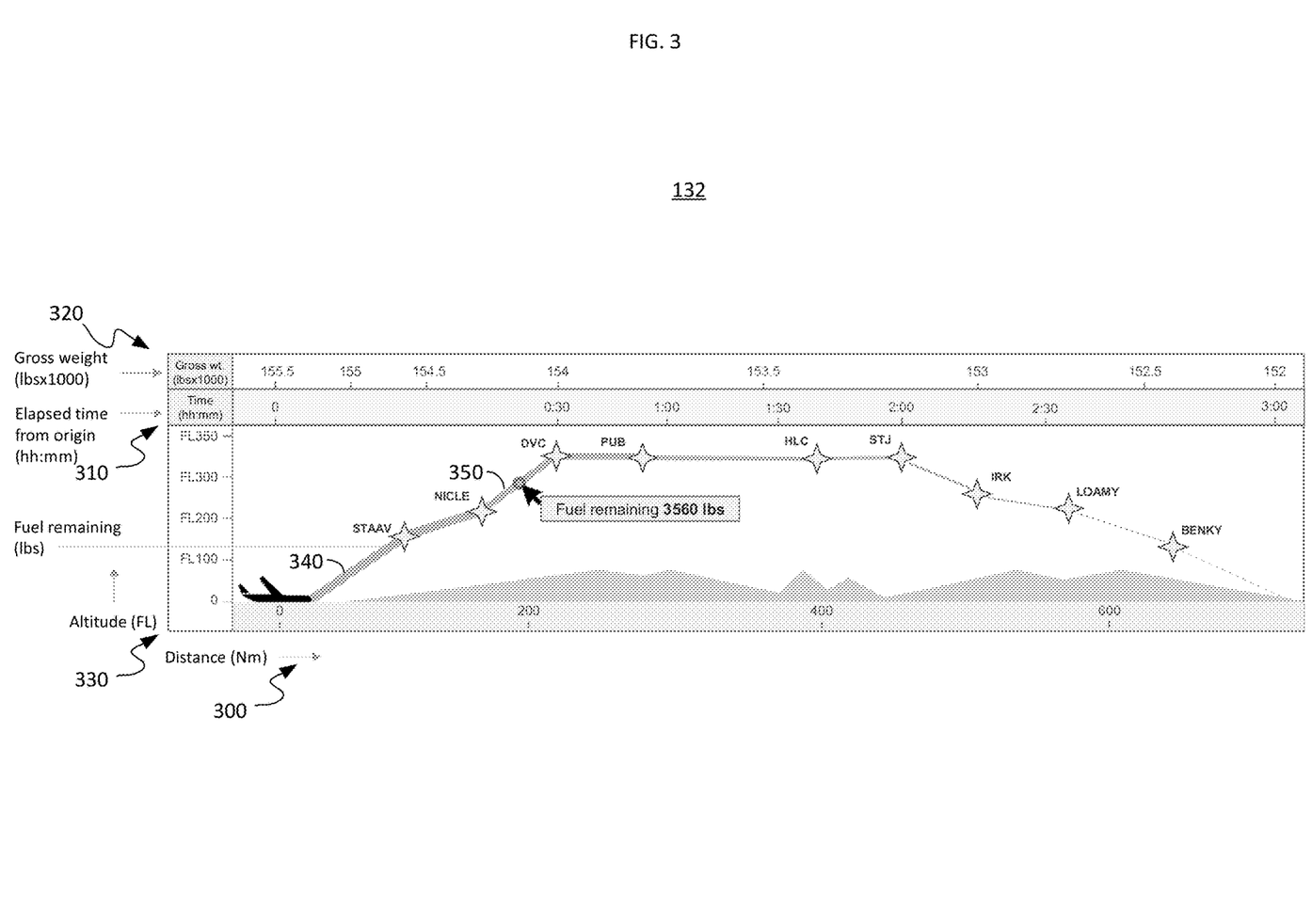
FIG. 3 is another exemplary display of the multi-dimensional visualization system, in accordance with an embodiment.

While FIG. 2 illustrates a display 132 with three variables, the multi-dimensional visualization system 130 can display any number of variables. FIG. 3 is an exemplary display 132 of the multi-dimensional visualization system 130, in accordance with an embodiment. In FIG. 3, three x-axis variables 300, 310 and 320 are displayed and one y-axis variable 330 is displayed and one overlaid variable 340 is displayed. Like the display in FIG. 2, the x-axis variable 300 is distance from origin and the y-axis variable 330 is altitude. The processor 134, based upon the selected variables, displays a vector 350 corresponding to flight plan data which is scaled to the chosen x-axis and y-axis variables, here x-axis variable 300 and y-axis variable 330. The other x-axis variables 310 and 320, elapsed time for from origin and gross weight, are scaled to a scale of the flight plan data of the vector 350 in a similar way as discussed above. While the x-axis variables 310 and 320 are both displayed on a top of the display, the x-axis variables could be displayed on the top of the display 132, the bottom of the display 132, or any combination thereof.

The overlaid variable 340 in this illustrated embodiment is a fuel remaining in pounds (lbs). Rather the generating a second vector, such as in typical multi-vectored displays, the processor adjusts a property of the vector 350 to represent the overlaid variable 340. In this embodiment, the thickness of the vector 350 is adjusted to represent the value of the overlaid variable 340 with a thicker vector 350 representing more fuel and a thinned vector 350 representing less fuel. However, other properties of the vector 350 may be adjusted. For example, a color of the vector 350 may be adjusted to represent a value. As another example, the vector 350 may be displayed as dots, dashes or the like, a frequency of which may represent the overlaid variable. Each visual property of the vector 350 can represent a different variable depending upon how many variables the user wishes to see. As seen in FIG. 3, a value of the overlaid variable 340 may be displayed when the user interacts with a specific point of the vector 350. However, the values of all of the variables at the specific point could be displayed in a similar manner. Accordingly, in this embodiment, the relative values of all five variables can be visualized in a single display while maintaining the readability of a single vector display.

Figure 4:
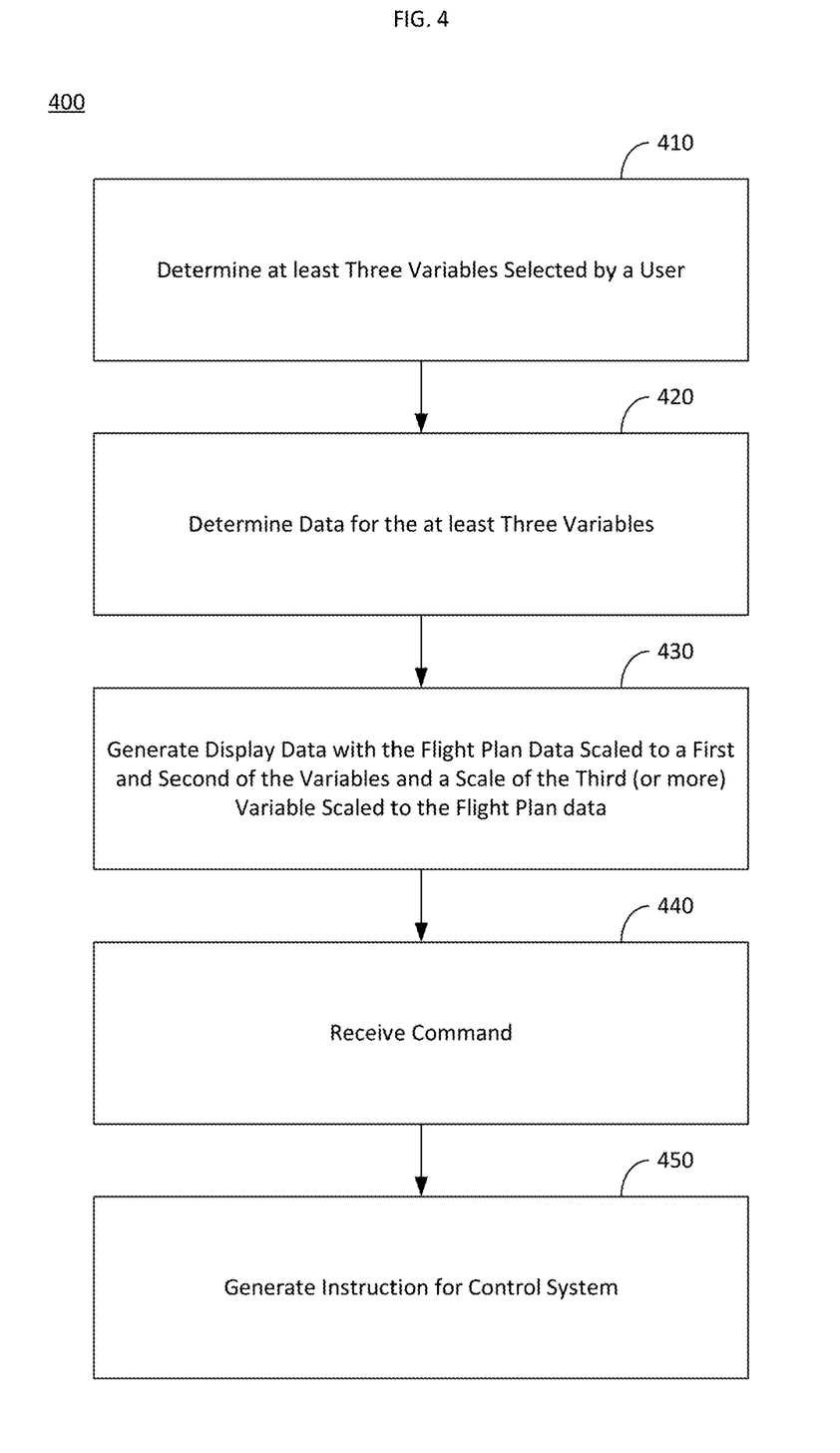
FIG. 4 is a flow chart illustrating a method for operating the multi-dimensional visualization system, in accordance with an embodiment.

FIG. 4 is a flow chart illustrating a method 400 for operating the multi-dimensional visualization system 130, in accordance with an embodiment. The method begins when a user selects at least three variables of the flight plan or property of the aircraft to be visualized together. (Step 410). As discussed above, the user may utilize the input system 138 to select the variables. One of the variables may be selected as the first x-axis variable and one of the variables may be selected as the first y-axis variable. As discussed above, the vector representing the flight plan generated by the processor is scaled to the first x-axis variable and the first y-axis variable. In one embodiment, for example, when the display 132 is a vertical situation display, the first x-axis variable and the first y-axis variable may be preselected based upon a current view of the vertical situation display. However, as discussed above, all of the variables, including the first x-axis variable and the first y-axis variable may be selectable by a user of the multi-dimensional visualization system 130.

The third and any other selected variables may be selected to be an x-axis variable, a y-axis variable or an overlaid variable. Any combination of x-axis, y-axis and overlaid variables may be used. The location and type of the third or more variables may be selected in a variety of ways. For example, a user may interact with the x-axis of the vertical situation display using the input system 138 to add a second x-axis variable. Likewise, the user may interact with the vector of the vertical situation display using the input system 138 to add an overlaid variable to the vector. However, any selection method may be used, including, but not limited to, checkboxes or the like to select individual variables, preselected combinations of variables for a specific flight data analysis, or the like. In one embodiment, for example, the processor 132 may automatically select a location and other properties of the third or subsequent variables based upon historic user data. In other words, if the user selects, for example, three variables, the processor 132 may display the three variables in the same configuration as the last time the user selected the three variables.

The processor 134 then determines the data for the selected variables. (Step 420). The determined data may include flight plan data. As discussed above, the FMS 110 maintains the flight plan data for the aircraft 100. Accordingly, the processor 134 may request the flight plan data for the selected variables from the FMS 110. The determined data may also be based upon data from the sensors 120, such as a current wind speed, wind direction, temperature, altitude, or any other sensor data. The determined data may also be received from a communication system 150. Weather, wind and temperature data, for example, may be received by a communication system 150 from an external source. Any data which is broadcast or receivable from a communication system 150 may be included in the display.

The processor 134 then generates display data for the display 132 based upon the selected variables. (Step 430). The display data includes a scale of the x-axis variable, a scale of the y-axis variable and a vector. As discussed above, the vector (e.g., vector 240 in FIG. 2 or vector 350 in FIG. 3) corresponds to the flight plan data and is scaled to correspond to the scales of the selected x-axis variable and the selected y-axis variable. The generated display data further includes the scales for the third and any subsequent variables selected by the user. As discussed above, the third variable, and any subsequent variables, is displayed as a non-linear scale on the display 132, which is scaled or otherwise adjusted to the flight plan data of the vector. In other words, rather than plotting multiple vectors on the display which makes the display difficult to read, the data corresponding to the third and any subsequent variables can be read merely by corresponding the vector to the non-linear scales corresponding to the thirds and subsequent variables.

The user may then perform flight data analysis based upon the display 132. Depending upon the variables selected, numerous flight data analysis and optimization actions may be performed. The actions may include, but are not limited to, flight plan optimizations, such as time constraints, speed constraints, waypoint locations, or the like in response to combinations of variables. The flight data analysis may be done on paper by hand, or by using one or more tools on the multi-dimensional visualization system 130.

In one embodiment, for example, the user may optionally input a command for the aircraft 100 utilizing the input system 138 or any other input system on the aircraft 100. (Step 440). The command may be issued when the flight data analysis suggests a change to the current flight plan. For example, the command may be to control the movement of the aircraft 100 based upon the flight data analysis. When a command is received, the processor 134 or a processor associated with the input system utilized by the user, generates a command for the respective control system 140 associated with the command. (450).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
   a flight management system configured to manage flight plan data of the aircraft;
   a vertical situation display; and
   a processor communicatively coupled to the flight management system and the vertical situation display, wherein the processor is configured to:
   determine a first variable, a second variable, a third variable, a fourth variable and a fifth variable for the vertical situation display, each of the first, second, third, fourth and fifth variables having a scale;
   determine flight plan data from the flight management system for the first, second, third, fourth and fifth variables;
   generate display data for the vertical situation display, the display data including,
   a first variable display of linear values along a first single axis,
   a second variable display of linear values along a second single axis that is parallel to the single axis of the first variable display,
   a vector display that comprises flight plan data of the third variable and the fourth variable, where the third variable and the fourth variable both display linear values along a third axis and a fourth axis that are perpendicular to each other, and
   an overlaid display that comprises the flight plan data of the fifth variable, where the overlaid display shows a value of the fifth variable with respect to each other variable when a point along the vector display is reached by the aircraft;
   output the generated display data to the vertical situation display for display on the vertical situation display.

2. The aircraft of claim 1, further comprising:
   at least one control system configured to control movement of the aircraft; and
   a user input system,
   wherein the processor is further configured to:
   receive, from the user input system, a command based upon the vertical situation display; and
   generate an instruction for the at least one control system based upon the received command, the instruction causing the at least one control system to control movement of the aircraft.

3. The aircraft of claim 1, wherein the scale of the fifth variable varies a thickness of the overlaid display based upon the flight plan data corresponding to the fifth variable.

4. The aircraft of claim 1, wherein the scale of the fifth variable varies a color of the overlaid display based upon the flight plan data corresponding to the fifth variable.

5. The aircraft of claim 1, wherein the scale of the fifth variable varies a pattern of the overlaid display based upon the flight plan data corresponding to the fifth variable.

6. A method of operating a vertical situation display in an aircraft, comprising:
   determining, by a processor, a first variable, a second variable, a third variable, a fourth variable and a fifth variable for the vertical situation display, each of the first, second, third, fourth and fifth variables having a scale;
   determining, by the processor, flight plan data from a flight management system for the first, second, third, fourth and fifth variables;
   generating, by the processor, display data for the vertical situation display, the display data including,
   a first variable display of linear values along a first single axis,
   a second variable display of linear values along a second single axis that is parallel to the single axis of the first variable display,
   a vector display that comprises flight plan data of the third variable and the fourth variable, where the third variable and the fourth variable both display linear values along a third axis and a fourth axis that are perpendicular to each other, and
   an overlaid display that comprises the flight plan data of the fifth variable, where the overlaid display shows a value of the fifth variable with respect to each other variable when a point along the vector display is reached by the aircraft;
   outputting, by the processor, the generated display data to the vertical situation display for display on the vertical situation display.

7. The method of claim 6, further comprising:
   receiving, by the processor, a command based upon the vertical situation display from a user input system; and
   generating, by the processor, an instruction for at least one control system on the aircraft based upon the received command, the instruction causing the at least one control system to control movement of the aircraft.

8. The method of claim 6, wherein the scale of the fifth variable varies a thickness of the vector based upon the flight plan data corresponding to the fifth variable.

9. The method of claim 6, wherein the scale of the fifth variable varies a color of the vector based upon the flight plan data corresponding to the fifth variable.

10. The method of claim 6, wherein the scale of the fifth variable varies a pattern of the vector based upon the flight plan data corresponding to the fifth variable.

11. A multi-dimensional visualization system for an aircraft, comprising:
    a display;
    a user input system;
    at least one control system configured to control movement of the aircraft;

a processor communicatively coupled to the display, the user input system, and the at least one control system, wherein the processor is configured to:

determine a first variable, a second variable, a third variable, a fourth variable and a fifth variable for the vertical situation display based upon input from the user input system, each of the first, second, third, fourth and fifth variables having a scale;

determine flight plan data from a flight management system for the first, second, third, fourth and fifth variables;

generate display data for the vertical situation display, the display data including, a first variable display of linear values along a first single axis, a second variable display of linear values along a second single axis that is parallel to the single axis of the first variable display, a vector display that comprises flight plan data of the third variable and the fourth variable, where the third variable and the fourth variable both display linear values along a third axis and a fourth axis that are perpendicular to each other, and an overlaid display that comprises the flight plan data of the fifth variable, where the overlaid display shows a value of the fifth variable with respect to each other variable when a point along the vector display is reached by the aircraft;

output the generated display data to the vertical situation display for display on the display;

receive, from the user input system, a command based upon the generated display data; and generate an instruction for the at least one control system based upon the received command, the instruction causing the at least one control system to control movement of the aircraft.

* * * * *